United States Patent
Ledet

(10) Patent No.: US 10,528,318 B1
(45) Date of Patent: *Jan. 7, 2020

(54) SYSTEM AND METHOD FOR SIMULTANEOUS TOUCH AND VOICE CONTROL

(71) Applicant: OPEN INVENTION NETWORK LLC, Durham, NC (US)

(72) Inventor: David Gerard Ledet, Allen, TX (US)

(73) Assignee: OPEN INNOVATION NETWORK LLC, Durham, NC (US)

(*) Notice: Subject to any disclaimer, the term of this patent is extended or adjusted under 35 U.S.C. 154(b) by 677 days.

This patent is subject to a terminal disclaimer.

(21) Appl. No.: 15/341,637

(22) Filed: Nov. 2, 2016

Related U.S. Application Data

(63) Continuation of application No. 13/461,988, filed on May 2, 2012, now Pat. No. 9,495,128.

(60) Provisional application No. 61/481,829, filed on May 3, 2011.

(51) Int. Cl.
| | |
|---|---|
| *G06F 3/16* | (2006.01) |
| *H04M 1/725* | (2006.01) |
| *H04W 4/021* | (2018.01) |
| *G06F 3/0488* | (2013.01) |
| *G06F 16/29* | (2019.01) |
| *G06F 16/9535* | (2019.01) |
| *G06F 3/0481* | (2013.01) |
| *G06F 3/0482* | (2013.01) |
| *G06F 17/21* | (2006.01) |

(52) U.S. Cl.
CPC .......... *G06F 3/167* (2013.01); *G06F 3/04883* (2013.01); *G06F 16/29* (2019.01); *G06F 16/9535* (2019.01); *H04M 1/72522* (2013.01); *H04M 1/72552* (2013.01); *H04W 4/021* (2013.01); *G06F 3/0482* (2013.01); *G06F 3/04817* (2013.01); *G06F 17/211* (2013.01); *G06F 2203/0381* (2013.01); *H04M 2250/22* (2013.01); *H04M 2250/74* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,257,575 B1 * | 8/2007 | Johnston | ............. | G06F 17/2247 |
| 2009/0089059 A1 * | 4/2009 | Ma | .......................... | G10L 15/06 |
| | | | | 704/254 |
| 2009/0100037 A1 * | 4/2009 | Scheibe | ............... | G06F 16/9537 |
| 2010/0114938 A1 * | 5/2010 | Weng | .................. | G06F 16/9535 |
| | | | | 707/769 |

* cited by examiner

*Primary Examiner* — Sherief Badawi
*Assistant Examiner* — Wendy Nicholas

(57) ABSTRACT

For a mobile computing device, enhanced functionality may be provided by associating actions with combined speech and touch gestures. A touch gesture is received into the device and simultaneously or near-simultaneously speech is received into the device. The touch gesture and speech are processed to determine a result and the device performs an action based on the result. In particular embodiments, commands for a mapping application may be based on spoken search terms and geographic areas marked by touch gestures.

20 Claims, 5 Drawing Sheets

SYSTEM AND METHOD FOR SIMULTANEOUS TOUCH AND VOICE CONTROL

CROSS REFERENCE TO RELATED APPLICATIONS

This application is a continuation of U.S. application Ser. No. 13/461,988 entitled SYSTEM AND METHOD FOR SIMULTANEOUS TOUCH AND VOICE CONTROL, issued as U.S. Pat. No. 9,495,128 on Nov. 15, 2016, filed on May 2, 2012, which claims priority to U.S. provisional patent application Ser. No. 61/481,829 entitled TOUCH AND VOICE CONTROL filed May 3, 2011, the disclosures of which are incorporated in their entirety herein by reference.

FIELD OF THE INVENTION

This disclosure relates to controls for mobile devices.

BACKGROUND OF THE INVENTION

Mobile devices have evolved into small computers that are able to perform tasks that just a few years ago few thought were possible. The current high-end devices are more powerful and integrated with more functionality allowing them to access the Internet in a seamless fashion. Wireless access to the Internet allows users to stay connected anywhere and anytime.

Current mobile devices utilize touch screens allowing users to interact with various applications. These touch screens utilize gestures that are mostly common among all devices allowing users to easily interact with the devices and applications.

Location services are also common among mobile devices. These applications allow users to perform certain actions including track where they are, search for items of interest near their current location, or obtain driving directions to destinations with respect to their current locations. Inherent in these map applications is the ability to use gestures. For example, if a user desires to zoom out of the displayed map, using two fingers or a finger and a thumb, the user can pinch the fingers together and the map zooms out. Consequently, if the user spreads the fingers apart, the map zooms in.

The added processing power of mobile devices allows speech to text operations. This technology allows users to replace the need for entering text into the mobile device by speaking into the microphone on the device. The speech is then analyzed and the converted speech is displayed to the user in text form. This greatly aids users in utilizing the mobile device in situations that are substandard (i.e. driving). Instead of typing on the small touch keyboard on the mobile device, the user is able to speak into the device and have the speech converted to text. While this functionality is relatively new for mobile devices, it is dependable and predictable.

SUMMARY OF THE INVENTION

The embodiments to be described relate to controlling a mobile device, and more particularly allowing both voice and touch gestures simultaneously or near-simultaneously to control an application residing on a mobile device.

Users of mobile devices are currently able to provide input by touch. Many current mobile devices contain touch screens wherein the users are able to utilize either a touch device (e.g. stylus), or a finger to provide input to the device. Also available in mobile devices is speech recognition functionality where the user's speech is converted into text, also known as speech-to-text.

In the present disclosure, there will be described embodiments that combine the touch gesture functionality with speech recognition which further includes natural language processing. In doing so, new functionality is presented and is described in detail below in example mobile applications allowing a more fluid interaction with the user of the mobile device and the mobile application. The examples below will show that the applications utilizing the functionality in the current disclosure are more intuitive and functionalities that took multiple actions can be achieved in one step.

There will also be described embodiments in which users who have entered similar searches may be notified or made aware of each other's process in order to facilitate social interactions.

In one aspect of the disclosure, there is provided a method for providing a control on a mobile communications device comprising receiving speech into a mobile communications device, receiving a touch gesture into the mobile communications device, processing the speech and the touch gesture to determine a result of the combination of the speech and the touch gesture, and performing an action with the mobile communications device that is based on the result.

In one aspect of the disclosure, there is provided a mobile computing device configured to receive speech into the mobile computing device, receive a touch gesture into the mobile computing device, process the speech and the touch gesture to determine a result of the combination of the speech and the touch gesture, and perform an action with the mobile computing device that is based on the result.

In one aspect of the disclosure, there is provided a non-transitory computer readable medium comprising executable instructions for receiving speech into a mobile communications device, receiving a touch gesture into the mobile communications device, processing the speech and the touch gesture to determine a result of the combination of the speech and the touch gesture, performing an action with the mobile communications device that is based on the result.

BRIEF DESCRIPTION OF THE DRAWINGS

Reference will now be made, by way of example only, to specific embodiments and to the accompanying drawings in which.

DETAILED DESCRIPTION OF THE INVENTION

Touch Gestures

Touch screens have been on the market since the mid '70s, but have gained popularity through the inclusion of touch screens in smart phones, Personal Digital Assistants (PDAs), tablet computers, portable gaming consoles, and many types of mobile information appliances. Touch screens have also gained popularity in locations where a keyboard and mouse do not allow a suitably intuitive, rapid, or accurate interaction by the user with the display's content, such as a kiosk.

A version of gestures entitled "Multi-Touch Gestures" utilizes multiple simultaneous touches to provide additional functionality. For example, a user can perform an action called "pinching" where two fingers are brought together to zoom out on an image. Another multi-touch gesture called "reverse pinching" refers to the spreading of two fingers apart, and is used to enlarge a picture or zoom in on an image. Apple Inc.'s® recent operating system supports many multi-touch gestures where 2, 3 and even 4 fingers can be used to perform various actions on components on the display.

Speech Recognition

Speech recognition allows a device to receive speech from a user, and performs actions based on the received speech. Speech-to-text is the process where the device allows the user to speak into the microphone and the speech is converted to text and the text is used in the application just as if the user had typed it on the keyboard. Natural Language Processing (NLP) is concerned with the language of the user, and attempts to understand the linguistics of what the user is attempting to say. NLP attempts to understand language that humans use naturally. Using NLP, the application of the current invention processes the speech and the application uses this as input, along with the touch gesture to perform a new action.

Figure 1:
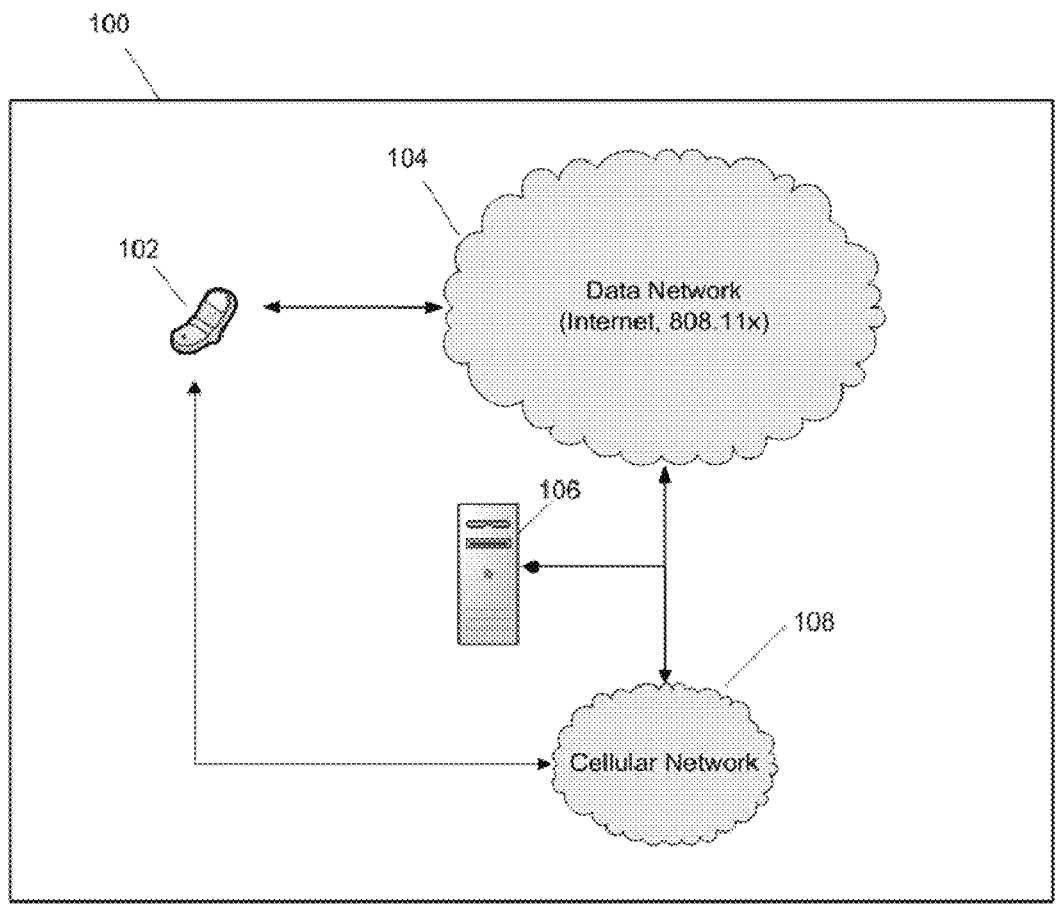
FIG. 1 shows a network architecture.

FIG. 1 below depicts a network diagram of how the application of the current embodiments may reside in relation to the cellular network and the Internet.

FIG. 1 displays a network architecture 100. For the purposes of this disclosure, it is assumed that an application that embodies the methods of the present disclosure resides on the client machine 102 though the application could similarly be hosted on other devices, such as servers, computers within a computing cloud and accessed from the client device 102 via suitable networks, for example using internet and/or wireless protocols. While the client device 102 is depicted as a cellular phone, it should be noted that other types of devices may be used. For example, a PDA, a tablet computer, a laptop, an MP3 player, a gaming device (such as a hand held system or home based system) and the like (including a P.C. or other wired device) that can also transmit and receive information could be used.

The user interfaces through the client device 102. In addition to the GUI located at the client's location 102, the application will communicate with functionality located on the server 106 (for example the speech-to-text functionality, and the voice stress analysis functionality) through either the Internet 104, or the cellular network 108.

Speech-To-Text Functionality on a Mobile Device

The application can reside on a user's mobile device. This functionality of the invention can reside in an "App", or program executing on the mobile device 102, or be part of the mobile device's operating system, allowing it to interface with programs loaded on and/or executing on the device.

On a mobile device, the touch gesture and voice-to-text functionalities exist on the device, or can be accessed by the device, assuming that the mobile device is a phone with advanced capabilities (smartphone). A smartphone is a mobile device containing PC-like functionality. Usually, smartphones offer more advanced computing ability and connectivity than a contemporary cellular phone.

The combining of the touch gesture and voice-to-text functionalities can be interworked with the mobile device's software development kit (SDK). Speech recognition is built into many common mobile device SDKs. For example, in the Android release of SDK 1.5, a library included in that release called android.speech allows speech recognition functionality.

In the Android 1.5, speech recognition is done through the Recognizerintent. The intent starts an activity that will prompt the user for speech and send it through the speech recognizer. For example, the code below starts an activity with an intent and the application waits for the result:
Intent intent=new Intent("android.speech.action.RECOGNIZE_SPEECH");
startActivityForResult(intent, 0);

The startActivityForResult method launches an Activity returning the result. While speech recognition is performed, it displays an overlay over your app, and when done returns the results back for your activity to handle. The action: RECOGNIZE_SPEECH starts an activity to recognize the speech and send the result back to the activity. The voice recognition application that handles the intent processes the voice input, then passes the recognized string back to the application by calling the onActivityResult( ) callback.

Android supports two language models for speech analysis: free_form for dictation, and web_search for shorter, search-like phrases. The invention of the current application utilizes the free_form model.

Finally, the example below depicts code to integrate speech-to-text to the application:
// Check to see if a recognition activity is present
PackageManager pkgmgr=getPackageManager( )
List activities=pkgmgr.queryIntentActivities(
    new Intent(RecognizerIntent.ACTION_RECOGNIZE_SPEECH), 0);
if (activities.size( ) !=0)
{speakButton.setOnClickListener(this);
}else
    {speakButton.setEnabled(false);
    speakButton.setText("Recognizer is not present");
    {
}

The sample pseudocode above first verifies that the target mobile device is able to interwork with the speech input, then uses startActivityForResult( ) to broadcast an intent requesting voice recognition, including the extra parameter specifying one of two language models. The voice recognition application that handles the intent processes the voice input, then passes the recognized string back to the application by calling the onActivityResult( ) callback.

In one embodiment, instead of utilizing Speech-to-Text where the speech is converted to text that is then used as input to the application, the application utilizes Natural Language Processing (NLP). Through the use of NLP, the speech is received from the user and processed. The resultant outcome from the processing is used as input to the application, when combined with the touch gesture, a new method or procedure is executed.

Figure 2:
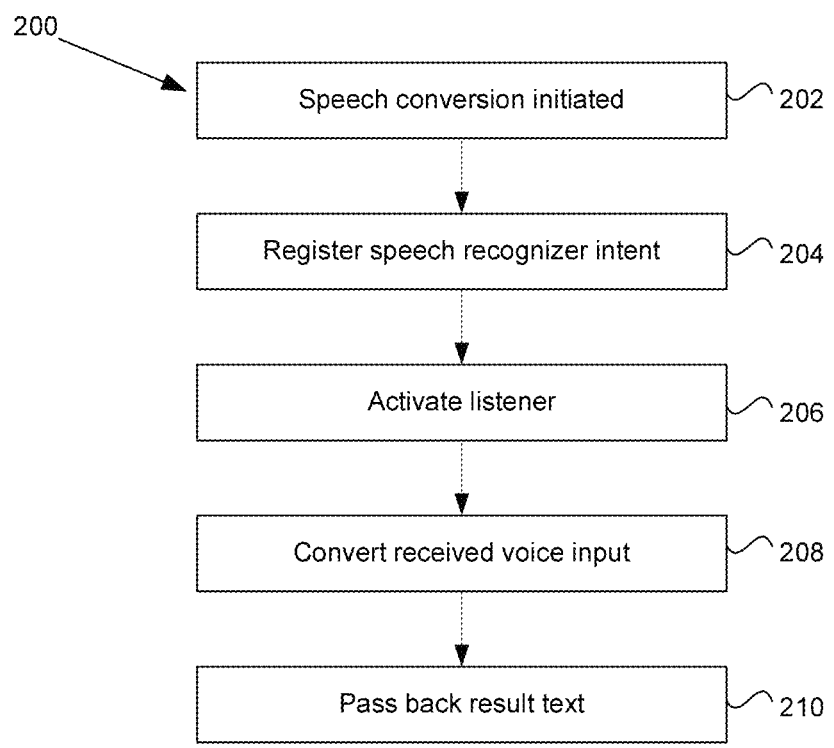
FIG. 2 shows a flow of the speech conversion process.

FIG. 2 depicts a flow 200 of the speech conversion process. The application initiates the speech conversion process 202. The intent requesting voice recognition is registered with the system 204. This allows the system to begin listening for the voice from the user, capturing the incoming speech and converting it to text. A listener is set on an existing component to receive the response from the voice recognition 206. This listener will receive the text from the converted speech 208. The result is received by the application 210 containing the text and the application is able to process the result.

Touch Gesture on a Mobile Device

The touch gesture functionality is inherent on smartphones in the market today. This functionality allows the user to use their finger (or other touch mechanism) to interface with the mobile device.

A common smartphone operating system in the market today is Android. In the Android environment, the primary point of access for touch data is the android.view.MotionEvent class. This class is passed to the views of the current application via the onTouchEvent and onInterceptTouchEvent methods. MotionEvent contains data about "pointers," or active touch points on the device's screen. Through a MotionEvent, X/Y coordinates can be obtained as well as size and pressure for each pointer. MotionEvent.getAction( ) returns a value describing what kind of motion event occurred.

In the Android application environment, the onTouch event is fired when the touch screen is interacted with by the user's finger or touching device (i.e. stylus, etc). The onTouch event can be handled similar to the following code:

```
public boolean onTouchEvent(MotionEvent event) {
  int action=event.getAction( );
  switch (action) {
  case (MotionEvent.ACTION DOWN):
    // Touch screen pressed
    break;
  case (MotionEvent.ACTION UP):
    // Touch screen touch ended
    break;
  case (MotionEvent.ACTION MOVE):
    // Contact has moved across screen
    break;
  case (MotionEvent.ACTION CANCEL):
    // Touch event cancelled
    break;
  }
  return super.onTouchEvent(event);
```

The pseudocode above handles different actions of the returned onTouch event thrown when the user interacts with the touch screen. The application can perform actions based upon the exact touch event thrown by the system.

Interaction of Touch Gestures and Speech Recognition

Interacting touch gestures with speech recognition is possible by an application executing on a mobile device. As described above, classes exist that allow applications to call methods for both functionalities.

Figure 3:
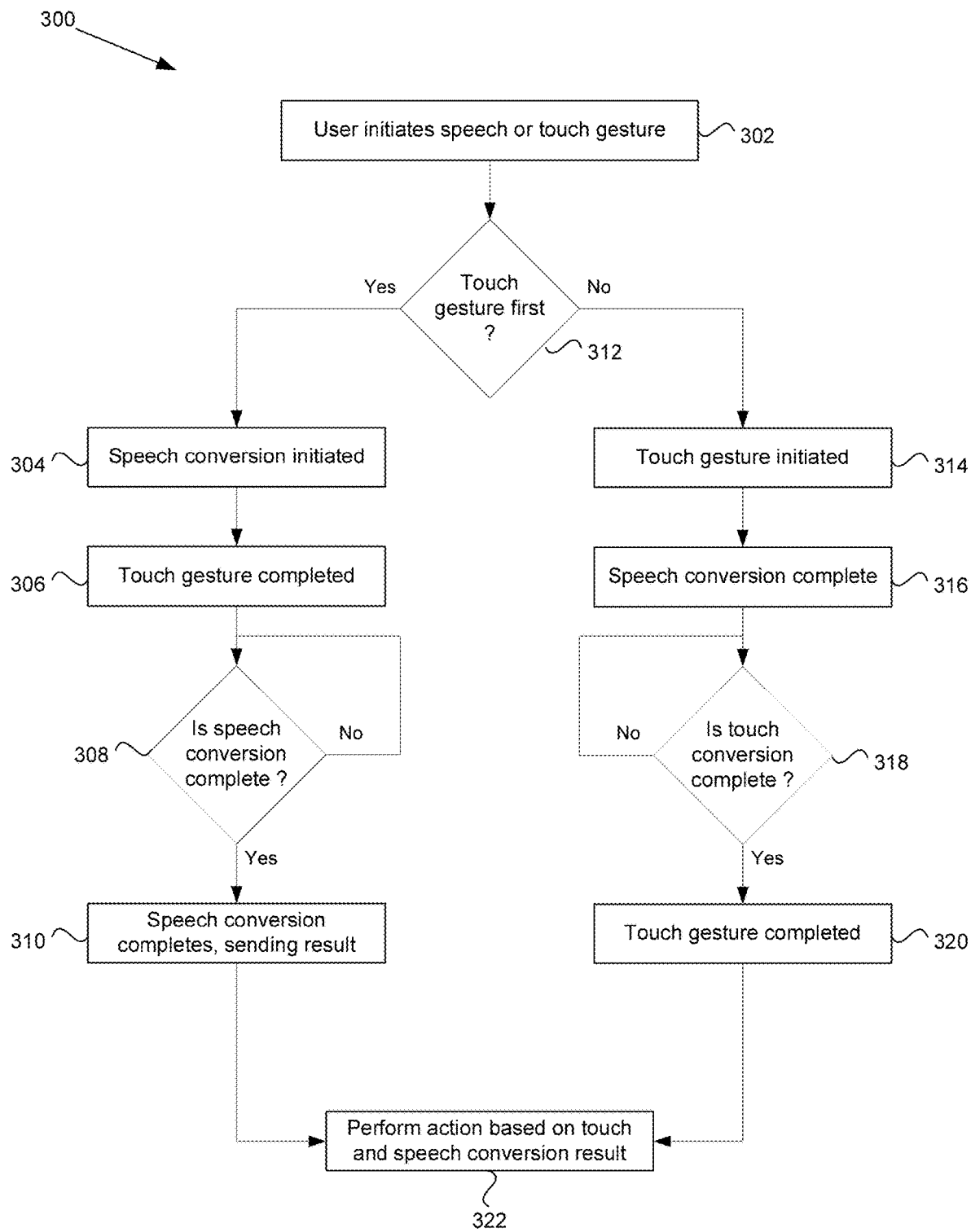
FIG. 3 shows a process for interpreting a combination of a touch gesture and speech to determine an action to be performed.

In FIG. 3, there is depicted a flowchart 300 showing the interactions of utilizing both touch gesture and speech conversion to allow an application to perform new functionality based on both inputs. The user initiates either a touch gesture or speech into the device's microphone 302. The order in which the speech and touch gesture are performed is not essential to the present disclosure in its broadest form and the description of one particular order herein or in the claims that follow is not intended to limit the disclosure to that particular order. If the initial action was a touch gesture (determination step 312), the speech conversion is initiated by allowing the user to speak into the device's microphone 304. The touch gesture completes 306. The application waits until the speech conversion is complete to continue 308. Once the speech conversion is complete the result of the conversion is made available to the application 310. A new action is performed utilizing the result of both the touch gesture and the speech conversion 322.

If the first gesture was speech 312, the touch gesture is initiated allowing the user to perform a touch gesture on the device 314. The conversion of the speech is complete and the result is made available to the application 316. The application waits for the touch gesture to complete before continuing 318. Once the touch gesture is complete, the touch gesture the result is made available to the application 320. A new action is performed utilizing the result of both the touch gesture and the speech conversion 322.

Figure 4:
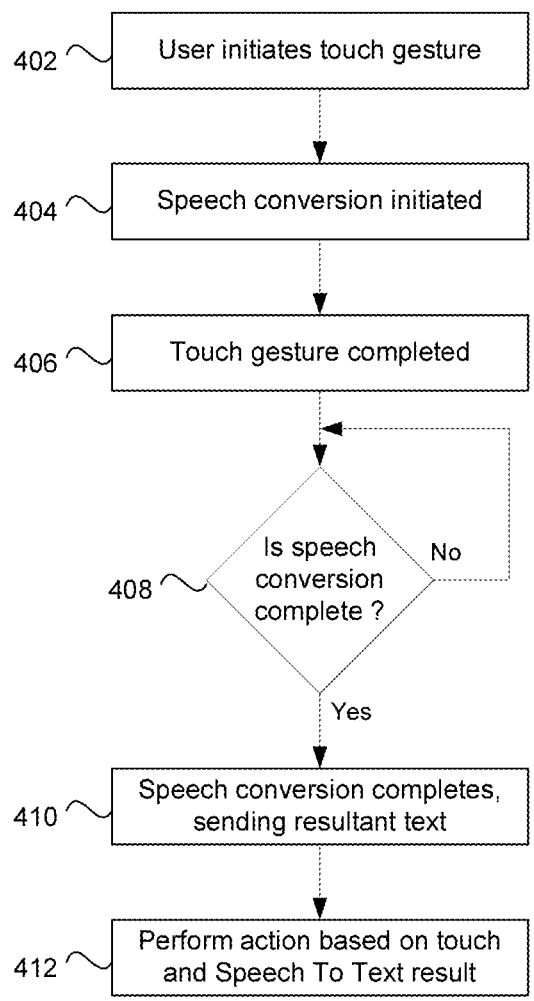
FIG. 4 shows a process in which a user touch gesture is initiated first.

FIG. 4 depicts the interactions between the touch gesture functionality and the speech conversion functionality. The example shows the user first making a touch gesture, followed by having the speech converted to text. The reverse process is also contemplated. The user will initiate the process by beginning a gesture on the mobile device screen 402. Upon indication that the user has begun a gesture action, the application will initiate the speech conversion process 404 where the user's speech is captured and converted to text. The touch gesture functionality completes 406 after the speech conversion has been initiated. Normally, the application acts upon the completion of the gesture, but with the application of the current disclosure, the process waits until the speech from the user is captured and converted to text 408 before taking any actions in the application. Once the speech has successfully been converted to text 410, this text string is returned to the application and processing of the application resumes. The normal activity of the gesture alone is combined with the string returned from the speech conversion and the new action is executed in the application 412.

The combination of the touch gesture and converted speech can be utilized in other applications. This disclosure provides examples where the functionality may be utilized. A programmer versed in mobile application development will be able to see the benefit of providing other applications where the additional functionality is beneficial.

Map Example

For example, assume that a user is interacting with and/or viewing a map application on a mobile device. The user can use a finger to navigate to different areas of the map. A pinch on the map zooms out, and when the user expands the map, the application responds with zooming into more detail. These gestures are commonly available with map applications on a mobile device.

Voice commands are also available in map applications. For example, map applications on a mobile device contain a search component. When clicked, the device displays a keyboard on the display where the user is able to type in a string or search parameter. Upon clicking a confirm button, for example, the map is searched for that string in the area displayed on the map. The user is also able to press a voice button, for example, that allows the user to speak into the mobile device. The speech is converted to text, and the text is displayed in the search component just as if the user had typed the string in.

Utilizing the currently described methods, the touch gesture and the speech input may be combined. When viewing a map on the mobile device, the user can initiate the functionality of the current application by pressing a button, for example. The user then uses voice to input the search string while using a finger to swipe on the map. If the user desires to search for a business that is north of the location displayed on the map, while speaking the name of the location, the user would swipe down on the map. The application would then understand that the user desires to search for the location north of where the map is currently displayed.

In another embodiment of the current disclosure, the application automatically accepts speech input from the user after a touch gesture is made in the application.

SMS Texting Example

In another example, texting can be integrated with voice commands to allow functionality that is not currently available. Let us assume that a mobile device is currently displaying an SMS chat session. The user can initiate the functionality of the current disclosure by pressing a button on the screen, for example. The user then says a formatting command such as the command "highlight". The application then waits for the user to slide a finger over some text in the chat session on the screen. The background of the text then changes color on the display indicating the text is chosen. Additional functionality can be interworked into the application allowing various actions to occur with the chosen text. For example, the application can display a list on the screen including "Email", "Forward Text". When the user chooses "Forward Text", the application responds with an SMS text compose screen with the text that was highlighted automatically inserted into the body of the message. The user can then choose a recipient and send the chosen text to the recipient.

Document Editing Example

In yet another example of the present disclosure, when editing a document, the user is able to utilize voice to assist when searching for a string in the current document. Assume that the user is editing a document, normally a user is able to perform an action that will allow a string to be entered, and a button is pressed to initiate the searching. In addition to searching for the string, the user speaks "backwards" to have the application search up for the string. If the user speaks "forwards", the application searches forward for the string. Other commands can be utilized that interwork with the application. For example, "top" can mean to go to the top of the edited document, or "bottom" can mean to go to the end of the edited document.

The functionality of the application initiates speech conversion upon acknowledgement of the user beginning a touch gesture. For example, when the user initiates a touch gesture in the map application, the map application calls the RECOGNIZE_SPEECH method (or intent) enabling the mobile device to also convert any speech. The result of the converted speech is utilized as input to the application, allowing the additional functionality combining the received touch gesture with the converted text.

In another embodiment of the current disclosure, specific touch gestures are used to indicate actions heretofore not available. When in the mapping application on a mobile device, the user draws a circle on the map using the touch gesture. This circle indicates the diameter of the search. Meaning that the user only wishes to find the businesses within the diameter of the circle drawn. A circle is described herein only as an example. The diameter of the searching can also be any other mechanism that a developer of the current invention deems acceptable. For example, a square could be used, or the user could touch two points in on the map to indicate the searching area.

For example, if the user desired to locate any Chinese restaurants within 1 mile of the current location, the user would view the current location on the map where the map is displaying a 4 mile diameter view. The user would draw a circle on the map with a finger about 1 mile out from the current location. The diameter of the circle would indicate a 2 mile diameter, or one mile in any direction from the current location. The user would then say "Chinese restaurant" in to the device's microphone. The application would then highlight the Chinese restaurants within 1 mile in any direction from the user's current location. Alternately, the user can say "Chinese restaurant" first followed by drawing the circle on the map. The same result would be shown.

In another aspect of the current disclosure, social aspects are interworked into mobile applications, particularly search applications. In a mapping and search application, when a server, such as server 106 of FIG. 1, detects two or more similar searches, the respective users who provided the search requests may be sent a notification of awareness that informs each other of their similar searches. The mapping application on a user's device 102 displays the other users, termed remote users herein, by showing the remote users indicated by an icon on the mapping application. The mapping application may work with the simultaneous gesture/speech application described above or may work independently thereof.

For example, the user of a mapping application draws a searching diameter on the mapping application and says "Chinese restaurant". The mapping application returns with the Chinese restaurants that are within the searched area. The searched businesses are highlighted on the mapping application (for example, a small store icon is shown on the user's mapping application). In addition, two other users (User2 and User3) have made similar search requests for a Chinese restaurant in the similar geographic area in a similar time window. They are indicated by a small person icon displayed on the user's mapping application indicating their respective current locations.

The user has the option to click on User2's person icon, and User3's person icon to obtain the contact information of User2 and User3. The contact information displayed to the user is the contact information that User2 and User3 has previously configured as opt-in information. When the user clicks on User2 and User3, the restaurant icon on the mapping application is updated to display the best Chinese restaurant that is in best proximity to the user of the current invention, User2, and User3. In this way, all three of the users are able to meet at the best location that is in the best proximity of all three of the users (the user of the current invention, User2, and User3).

In addition, according to the configuration of the application, other determinations of the best business displayed to all three users (the user of the current invention, User2, and User3) can be displayed. For example, the Chinese restaurant that is the nearest in proximity to all three users, the safest restaurant that is nearest to all three, or the restaurant that is within a predetermined food rating that is in proximity to all three.

The server and/or application may pre-define what constitutes a similar search request. For example, a similar request may be generally similar, such that any UserB searching for a restaurant within an overlapping geographic area is indicated. A similar request may be specifically similar, such that only a UserB that is searching for a Chinese restaurant will be indicated. Parameters for similarity may include search terms, geographic area, time windows, etc. Other parameters will be apparent to a person skilled in the art.

The server 106 gathers the requests from the remote users (UserB) and sends the acknowledgement to the client 102, so that the application executing on the client 102 is made aware of the similar requests.

Figure 5:
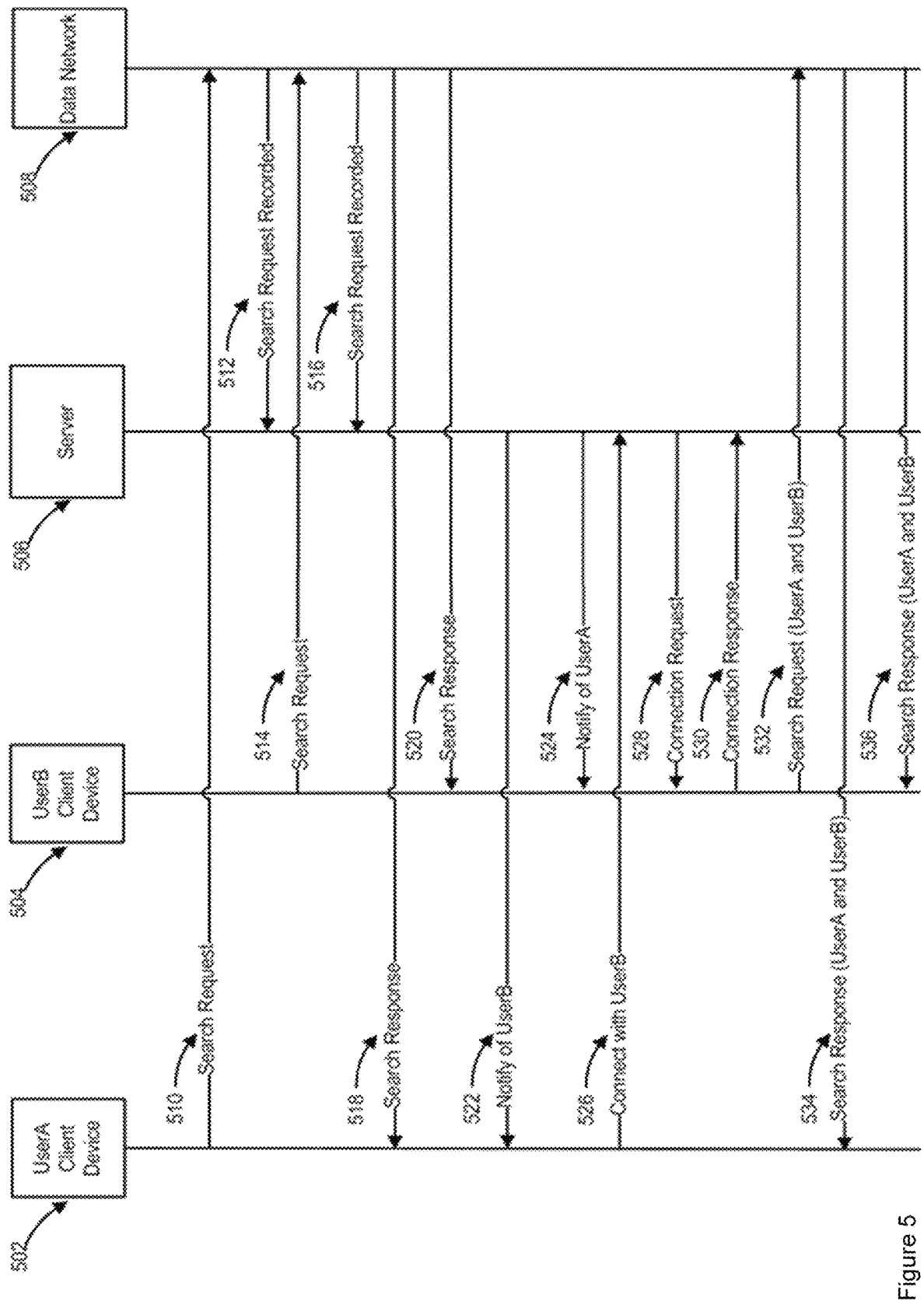
FIG. 5 shows a message flow for notifying multiple users of similar searches.

FIG. 5 depicts a message flow between the systems of the network when the user of the current invention (UserA) and a remote user (UserB) searches for similar businesses, for example a Chinese restaurant, within the same geographic location.

In FIG. 5, the user of the application is depicted as UserA Client Device 502. A remote user is depicted as UserB Client Device 504. The Server 506 is the data server connected to the Data Network 508. The communication between the Users Devices 502, 504 and the Server 506 and the Data Network 508 could be a mobile network 104, internet network or the cellular network 108.

UserA initiates a search request by utilizing the search/mapping application on their device. For example, UserA requests to find the nearby Chinese restaurants. A search request is sent from the mobile device to the Data Network 510. The Data Network notifies the Server that a search request is made by the application on the UserA device. This allows the Server to be made aware of requests and to allow the server to be able to notify users of similar requests. UserB requests to also find the nearby Chinese restaurants, and a search request is sent form the mobile device to the Data Network 514. The Data Network notifies the Server that a request is made by the application of the current invention 516.

The Data Network sends a search response to UserA's device indicating the locations of the requested business 518, allowing the application on UserA's device to update indicating the searched establishment(s). The Data Network sends a search response to UserB's device indicating the locations of the requested business 520, allowing the application of UserB's device to update indicating the searched establishment(s).

The Server is aware of both UserA and UserB requests, and programming within the server allows the server to detect and realize that both of UserA and UserB are within the same geographic location (e.g. within a predefined distance) and have entered similar search requests. By similar, it is meant that the search requests are within suitable parameters, in this case, both search requests relate to restaurants and more particularly to Chinese restaurants, within an overlapping geographic area. The Server sends a message to UserA's device 522 providing notification of UserB. UserA's application is then updated with an icon on the map indicating UserB's location. This could be a small person icon displayed on UserA's map, or any other similar icon. The Server sends a message to UserB's device 524 providing notification of UserA. UserB's application is also updated with UserA's location.

UserA, after seeing the icon on the map of UserB, performs an action that allows the application to send a connect message to the Server 526. This action can be a touch of UserB's icon on the map. The Server then sends a connection request message to UserB's device indicating that UserA desires to connect 528. UserB is notified by the application of the connection request. This could be a changing color of UserA's icon, or any other method of notification, for example, a message notification can be delivered to UserB.

UserB then, desiring to establish the connection, performs an action that tells the application to establish the connection. This can be a touch of UserA's icon, or an acknowledgement of the notification message, assuming that a notification message was sent to UserB. This causes a connection response message to be sent to the Server 530.

The Server, now aware that UserA and UserB desire to establish a connection sends a new search request to the Data Network 532. This new search request has the geographic location of both UserA and UserB. The Data Network now attempts to find the Chinese restaurants that are in the vicinity of both UserA and UserB. The Data Network sends a search response to UserA's device 534 and to UserB's device 536 to indicate the Chinese restaurant(s) that is closest to UserA's location and UserB's location.

At this point, UserA and UserB can communicate and exchange information through a voice call or text messages, assuming that they have chosen to publish their mobile device numbers in their configuration of the application. Other methods of communication can also be made available according to the configuration.

In another embodiment of the current disclosure, the user can say terms after saying the name of the establishment searched for. For example, if the user is searching for Chinese restaurants, but only interested in restaurants in safe neighborhoods, the user would say "Chinese restaurant safe neighborhood". The application would return those restaurants considered to be safe. The safety of the area can be ascertained by calculating police reports in the area, or previous user's comments received by the map application, or any other method found to rate neighborhoods.

In another embodiment of the current disclosure, the user would only be shown restaurants that remain open given the distance that the user has travel to get to the location. For example, if the current time is 9:50 pm, the restaurants that close at 10:00 pm would not be displayed unless the current location of the user is such that a 10:00 pm closing would still allow time for the user to get to the location and make an order before the closing.

In another embodiment of the current disclosure, the user can say a minimum score of the restaurant after saying the name. For example, if the user desired to see the locations of all Chinese restaurants within the diameter of the drawn circle that scored a 4 out of 5 stars, the user would say "Chinese restaurants four". The rating of the restaurants is determined by the mapping application by obtaining the previous customer ratings received, or by a local or national rating site.

In another embodiment of the current disclosure, the user is able to view comments about nearby restaurants by drawing a circle to determine the searching diameter, the saying the name of the business searching for, followed by "comments". The user will then be shown nearby restaurants and when clicking on the restaurant icon on the map, the application displays the previous user comments received by the mapping application, or comments received by the business and made available by the mapping application.

The components of the system 100 may be embodied in hardware, software, firmware or a combination of hardware, software and/or firmware. In particular, the application(s) may be stored as a set of executable instructions in a non-transitory computer readable medium that is operatively associated with the client device 102.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method comprising:
   processing speech and a touch gesture to determine a result of a combination of the speech and the touch gesture, wherein an order of receipt of the speech and the touch gesture is generated; performing an action with a wireless communications device that is based on the result and the order of receipt, wherein the action is performed on a document and wherein an area of the document is identified by a combination of the touch gesture and the speech, wherein said action performed on said document is searching, and wherein said action performed is a new search request in a similar geographic area and within a similar time window of a similar search of other users;
   reporting results to opted in wireless communication devices, wherein reporting the results includes displaying icons on the document indicating the other users who have performed the similar search in their respective current locations and icons indicating locations of the search results;
   receiving an additional input to select the other users identified by the similar search; and
   highlighting the search result that is nearest in proximity to the user and the selected users.

2. The method of claim 1 wherein the touch gesture indicates a geographic area on a mapping application.

3. The method of claim 2 wherein the speech comprises one or more search terms.

4. The method of claim 3 wherein the action comprises executing a search of locations matching the search terms within the geographic area.

5. The method of claim 1 further comprising:
   receiving a second speech input via a wireless communications device;
   receiving a second touch gesture via the wireless communications device, wherein the touch gesture indicates an area of the document on which an action is to be performed and the speech indicates the action to be performed on the document area.

6. The method of claim 5 wherein the second speech input comprises a formatting command and wherein the touch gesture comprises the area of the document to be formatted.

7. The method of claim 5 wherein the second speech input comprises an emailing command and wherein the touch gesture comprises the area of the document to be emailed.

8. The method of claim 5 wherein the second speech input comprises a search command and wherein the touch gesture comprises the area of the document to be searched.

9. The method of claim 1 wherein the speech comprises an area of a document to search from and the touch gesture comprises a direction in which to search.

10. A wireless computing device comprising:
    a processor coupled to memory storing executable instructions configured to:
    process speech and a touch gesture to determine a result of a combination of the speech and the touch gesture, wherein an order of receipt of the speech and said touch gesture is generated;
    perform an action that is based on the result and the order of receipt, wherein the action is performed on a document and wherein an area of the document is identified by a combination of the touch gesture and the speech, wherein said action performed on said document is searching, and wherein said action performed is a new search request in a similar geographic area and within a similar time window of a similar search of other users;
    report results to opted in wireless communication devices, wherein reporting the results includes displaying icons on the document indicating the other users who have performed the similar search in their respective current locations and icons indicating locations of the search results;
    receive an additional input to select the other users identified by the similar search; and
    highlight the search result that is nearest in proximity to the user and the selected users.

11. The wireless computing device of claim 10 wherein the touch gesture indicates a geographic area on a map application.

12. The wireless computing device of claim 11 wherein the speech comprises one or more search terms.

13. The wireless computing device of claim 12 wherein the action executes a search of locations that match the search terms within the geographic area.

14. The wireless computing device of claim 10, further comprising:
    receiving a second speech input;
    receiving a second touch gesture, wherein the touch gesture indicates the area of the document on which an action is to be performed and the speech indicates the action to be performed on the document area.

15. The wireless computing device of claim 14 wherein the second speech input comprises a format command and wherein the touch gesture comprises the area of the document to be formatted.

16. The wireless computing device of claim 14 wherein the second speech input comprises an email command and wherein the touch gesture comprises the area of the document to be emailed.

17. The wireless computing device of claim 14 wherein the second speech input comprises a search command and wherein the touch gesture comprises the area of the document to be searched.

18. The wireless computing device of claim 10 wherein the speech comprises an area of a document to search from and the touch gesture comprises a direction in which to search the document.

19. A non-transitory computer readable medium comprising executable instructions for:
    processing speech and a touch gesture to determine a result of a combination of the speech and the touch gesture, wherein an order of receipt of said speech and said touch gesture is generated; performing an action with a wireless communications device that is based on the result and the order of receipt, wherein the action is performed on a document and wherein an area of the document is identified by a combination of the touch gesture and the speech, wherein said action performed on said document is searching, and wherein said action performed is a new search request in a similar geographic area and within a similar time window of a similar search of other users;

reporting results to opted in wireless communication devices, wherein reporting the results includes displaying icons on the document indicating the other users who have performed the similar search in their respective current locations and icons indicating locations of the search results;

receiving an additional input to select the other users identified by the similar search; and highlighting the search result that is nearest in proximity to the user and the selected users.

20. The non-transitory computer readable medium of claim 19 wherein the touch gesture indicates a geographic area on a mapping application, wherein the speech comprises one or more search terms and wherein the action comprises executing a search of locations matching the search terms within the geographic area.

* * * * *